United States Patent
Schallenkamp

(10) Patent No.: US 11,470,837 B2
(45) Date of Patent: Oct. 18, 2022

(54) ANIMAL TRAP STABILIZING DEVICE

(71) Applicant: Keith Schallenkamp, Salem, SD (US)

(72) Inventor: Keith Schallenkamp, Salem, SD (US)

( * ) Notice: Subject to any disclaimer, the term of this patent is extended or adjusted under 35 U.S.C. 154(b) by 517 days.

(21) Appl. No.: 16/566,189

(22) Filed: Sep. 10, 2019

(65) Prior Publication Data

US 2021/0068385 A1 Mar. 11, 2021

(51) Int. Cl.
| | |
|---|---|
| *A01M 23/24* | (2006.01) |
| *F16M 13/02* | (2006.01) |
| *A01M 31/00* | (2006.01) |
| *A01M 23/26* | (2006.01) |
| *A01M 23/18* | (2006.01) |

(52) U.S. Cl.
CPC .......... *A01M 23/245* (2013.01); *F16M 13/02* (2013.01); *A01M 23/18* (2013.01); *A01M 23/26* (2013.01); *A01M 31/002* (2013.01)

(58) Field of Classification Search
CPC ...... A01M 23/00; A01M 23/02; A01M 23/18; A01M 23/245; A01M 23/24; A01M 23/26; A01M 1/026; A01M 2200/011; A01M 31/002; F16M 13/00; F16M 13/02
USPC ............... 43/58, 92, 96; 248/346.01, 346.02
See application file for complete search history.

(56) References Cited

U.S. PATENT DOCUMENTS

| | | | |
|---|---|---|---|
| 4,152,861 A | 5/1979 | Miller | |
| 4,267,660 A | 5/1981 | Kielhorn | |
| 4,411,091 A | 10/1983 | Hedstrom | |
| 4,458,394 A | 7/1984 | Schultz | |
| 4,492,056 A | 1/1985 | Reasland | |
| 4,499,685 A | 2/1985 | Sibley | |
| 5,481,824 A * | 1/1996 | Fiore, Jr. | ............... A01M 23/34 43/81 |
| 6,497,395 B1 * | 12/2002 | Croker | ..................... H02G 3/30 248/220.21 |
| 6,766,992 B1 * | 7/2004 | Parker | .................. F16M 13/022 248/219.3 |
| 6,910,299 B2 | 6/2005 | Butera | |
| 7,121,417 B2 * | 10/2006 | Magnusson | ............ A47B 57/16 211/90.02 |
| D557,117 S * | 12/2007 | Cannaverde | ................... D8/354 |
| 7,421,822 B1 * | 9/2008 | Ley | ..................... A01M 23/245 43/88 |
| 8,167,257 B2 * | 5/2012 | Beauvais | ............. A47B 95/008 248/217.1 |
| 8,251,322 B2 * | 8/2012 | Vincent | .................. F16M 13/02 361/679.21 |
| 8,443,569 B2 * | 5/2013 | Sias | ........................ E04B 7/063 52/696 |
| D700,833 S * | 3/2014 | Ng | ................................. D8/380 |
| 8,793,927 B2 * | 8/2014 | Winkler | .................. A01M 1/02 43/107 |

(Continued)

*Primary Examiner* — Timothy D Collins
*Assistant Examiner* — Nicholas Leo Seneczko

(57) ABSTRACT

An animal trap stabilizing system includes a body trap having a pair of jaws, a trigger engaging the jaws, and a torsion spring being attached to the jaws. The torsion spring is engaged with a plate. The plate has a top side, a bottom side, a first edge, a second edge, a third edge, and a fourth edge. The torsion spring includes a plurality of loops. The loops are attached to the plate such that arms of the torsion spring extend away from the fourth edge. The third edge is positioned on a ground surface such that an animal receiving orifice of the body trap is vertically orientated.

13 Claims, 8 Drawing Sheets

(56) References Cited

U.S. PATENT DOCUMENTS

| | | | |
|---|---|---|---|
| 9,565,850 B2* | 2/2017 | Hagerty | A01M 23/245 |
| 9,644,336 B2 | 5/2017 | McClard | |
| 9,848,594 B1 | 12/2017 | Lawrence | |
| 9,869,331 B2* | 1/2018 | Muntasser | F16B 2/08 |
| 10,490,991 B2* | 11/2019 | Ritosa | H02G 5/025 |
| 2003/0115790 A1* | 6/2003 | Domigan | A01M 23/26 43/77 |
| 2004/0123511 A1 | 7/2004 | Beauregard | |
| 2007/0040085 A1* | 2/2007 | Pincek | F16M 13/02 248/288.31 |
| 2009/0293340 A1 | 12/2009 | Kelley | |
| 2014/0021313 A1* | 1/2014 | Gagne | F16M 13/02 248/205.1 |
| 2018/0146657 A1* | 5/2018 | Reilly | A01M 23/24 |
| 2019/0376320 A1* | 12/2019 | Cheung | E05B 73/0082 |

* cited by examiner

US 11,470,837 B2

ANIMAL TRAP STABILIZING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to trap orientation stabilizer and more particularly pertains to a new trap orientation stabilizer for maintaining a trap in an upright position in a stable configuration.

(2) Description of Related Art Including Information Disclosed Under 37 CFR 1.97 and 1.98

The prior art relates to trap orientation stabilizer and more particularly helps to ensure that a body grip trap remains in an upright orientation after being armed.

BRIEF SUMMARY OF THE INVENTION

An embodiment of the disclosure meets the needs presented above by generally comprising a plate that has a top side, a bottom side, a first edge, a second edge, a third edge and a fourth edge. The first and second edges are positioned opposite of each other. The plate is comprised of a rigid material. The plate has an opening extending therethrough that is equally spaced from the first and second edges. The opening is positioned nearer to the fourth edge than the third edge. The opening has a distal edge with respect to the fourth edge. Two slits extend through the distal edge and are spaced from each other such that a flange is defined between the slits. The flange is configured to be bendable around a loop of a torsion spring. A tab is attached to and extends away from the fourth edge. The tab is positioned between a middle portion of the panel and the first edge. The tab has a break therein aligned with the fourth edge and extends toward the first edge to define a free section of the tab extending along the fourth edge. The free section is configured to be bendable around an arm of the torsion spring to inhibit movement of the torsion spring relative to the plate.

In another embodiment, the invention includes the method of providing a body trap including a pair of jaws, a trigger engaging the jaws, and a torsion spring being attached to the jaws. The torsion spring is engaged with a plate. The plate has a top side, a bottom side, a first edge, a second edge, a third edge, and a fourth edge. The torsion spring includes a plurality of loops. The loops are attached to the plate such that arms of the torsion spring extend away from the fourth edge. The third edge is positioned on a ground surface such that an animal receiving orifice of the body trap is vertically orientated.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
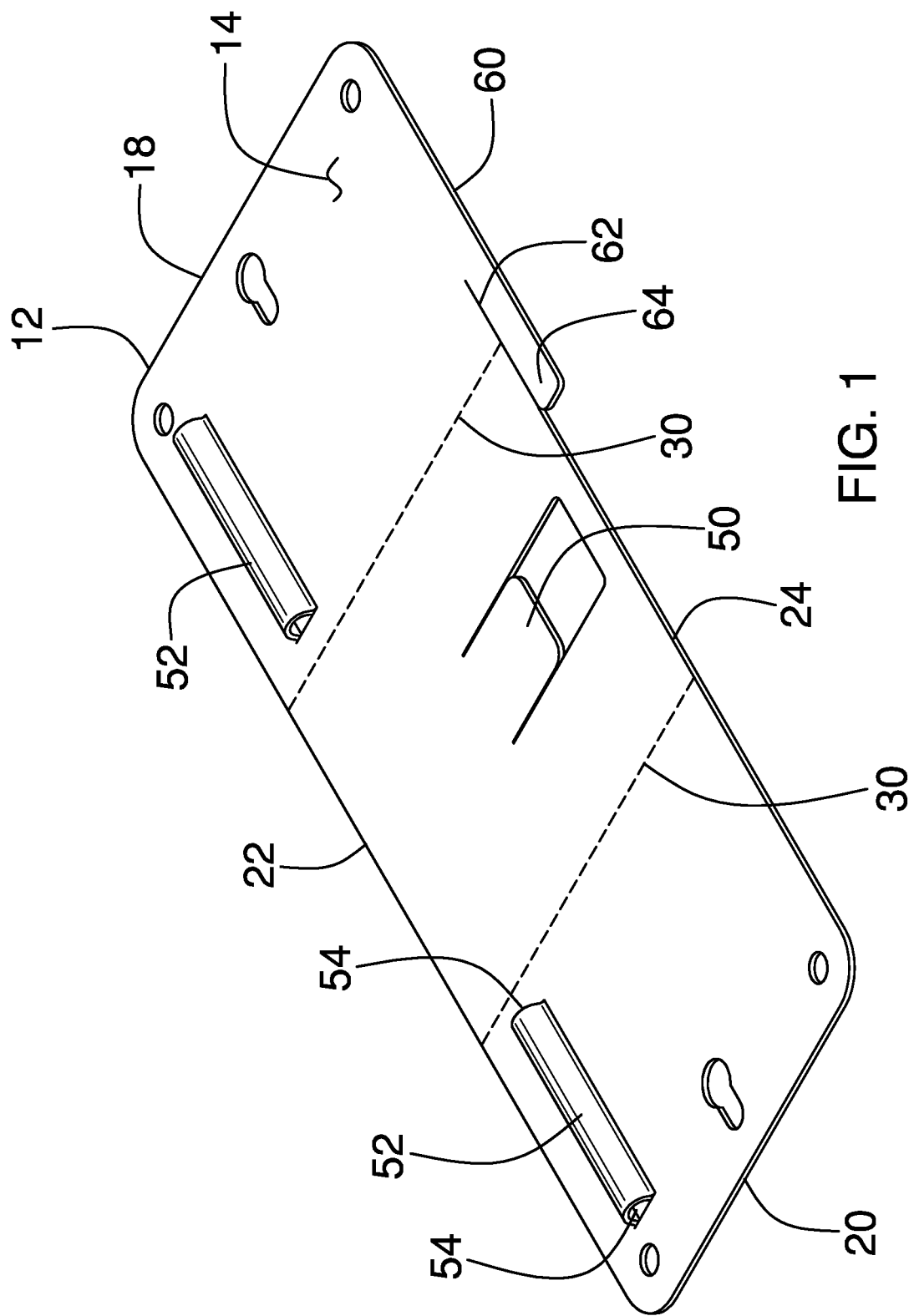
FIG. 1 is a top isometric view of an animal trap stabilizing device according to an embodiment of the disclosure.
Figure 2:
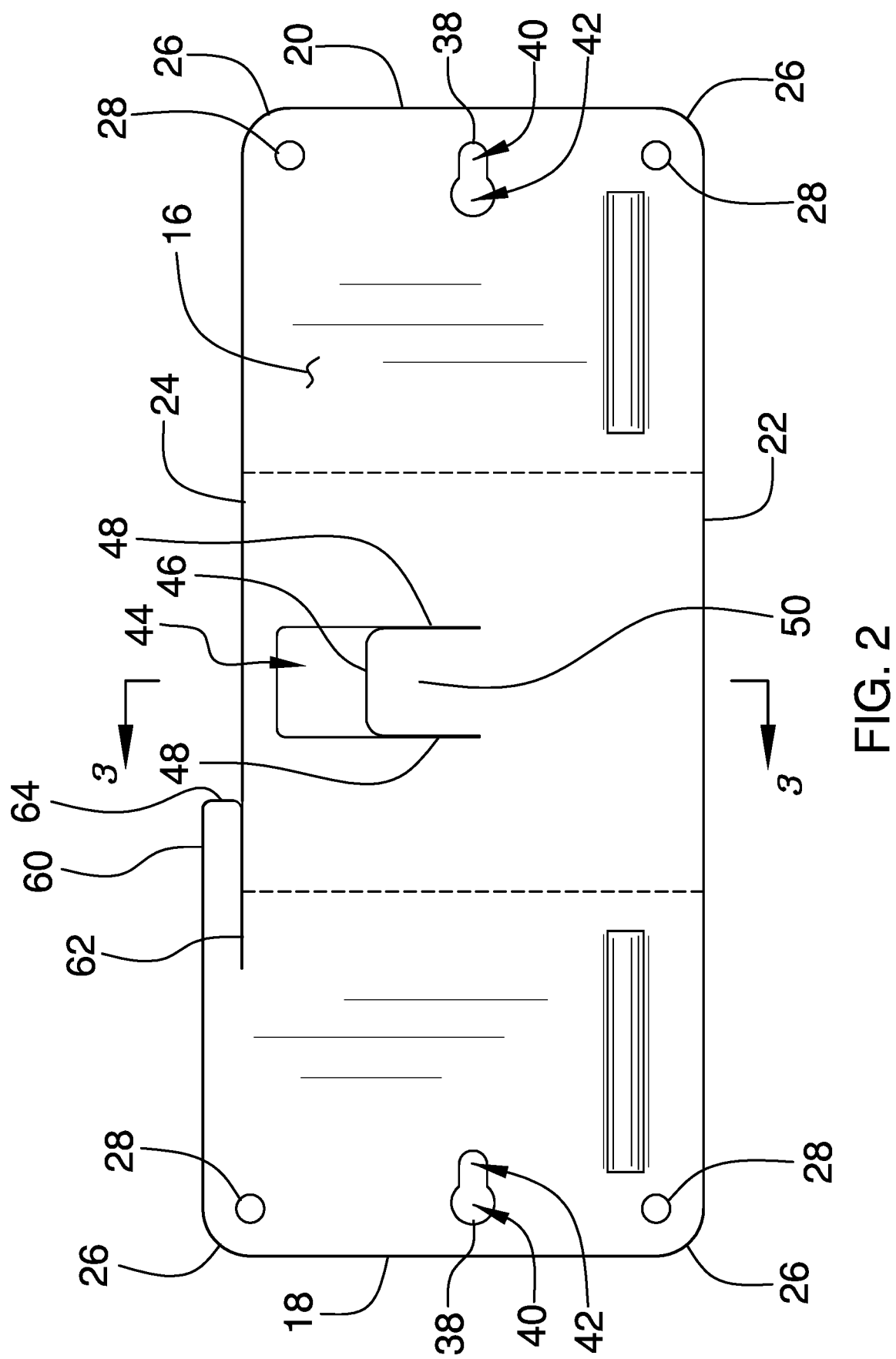
FIG. 2 is a bottom view of an embodiment of the disclosure.
Figure 3:
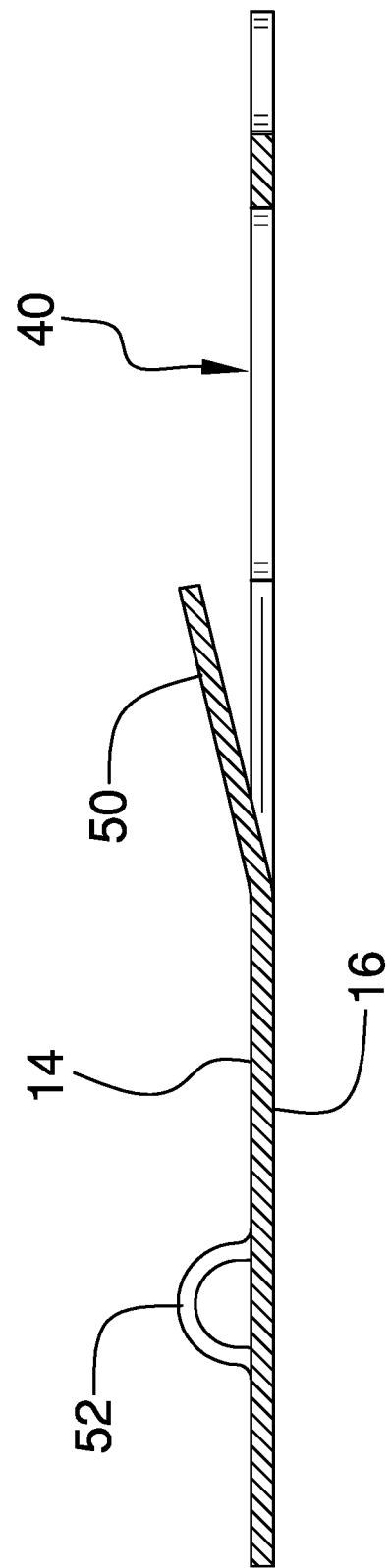
FIG. 3 is a cross-sectional view of an embodiment of the disclosure taken along line 3-3 of FIG. 2.

With reference now to the drawings, and in particular to FIGS. 1 through 8 thereof, a new trap orientation stabilizer embodying the principles and concepts of an embodiment of the disclosure and generally designated by the reference numeral 10 will be described.

As best illustrated in FIGS. 1 through 8, the animal trap stabilizing device 10 a plate 12 having a top side 14, a bottom side 16, a first edge 18, a second edge 20, a third edge 22 and a fourth edge 24. The first 18 and second 20 edges are positioned opposite of each other. The plate 12 is comprised of a rigid material such as a metallic material that while rigid may be bent such that it retains its shape. Plastics may be utilized but may not be as versatile as a metallic material. The plate 12 typically has a width from the first edge 18 to the second edge 20 between 7.0 inches and 9.0 inches and a length from the third edge 22 to the fourth 24 edge between 3.0 inches and 5.0 inches. The plate 12 has four corners 26 wherein each of the corners 26 is rounded.

The plate has a plurality of corner apertures 28 therein extending through the top 14 and bottom 16 sides. Each of the four corners 26 has one of the corner apertures 28 positioned adjacent thereto. The corner apertures 28 each have a diameter between 0.20 inches and 0.30 inches. The corner apertures 28 may be used, as needed, to receive stakes or fasteners to hold the plate down.

A pair of fold lines 30 is positioned in the plate 12 and extends from the third edge 22 to the fourth edge 24. The fold lines 30 may be formed by the material being thinner along the fold lines 30 or by perforations in the plate 12, for example. The fold lines 30 facilitate the bending of the plate 12 along the fold lines 30. The fold lines 30 are spaced from each other and divide the panel 12 into a first section 32 including the first edge 18, a second section 34 including the second edge 20 and a third section 36 positioned between the first 32 and second 34 sections. Each of the first 32 and second sections 34 has a same width as each other and the third section 36 has a width between 2.0 inches and 4.0 inches.

Figure 7:
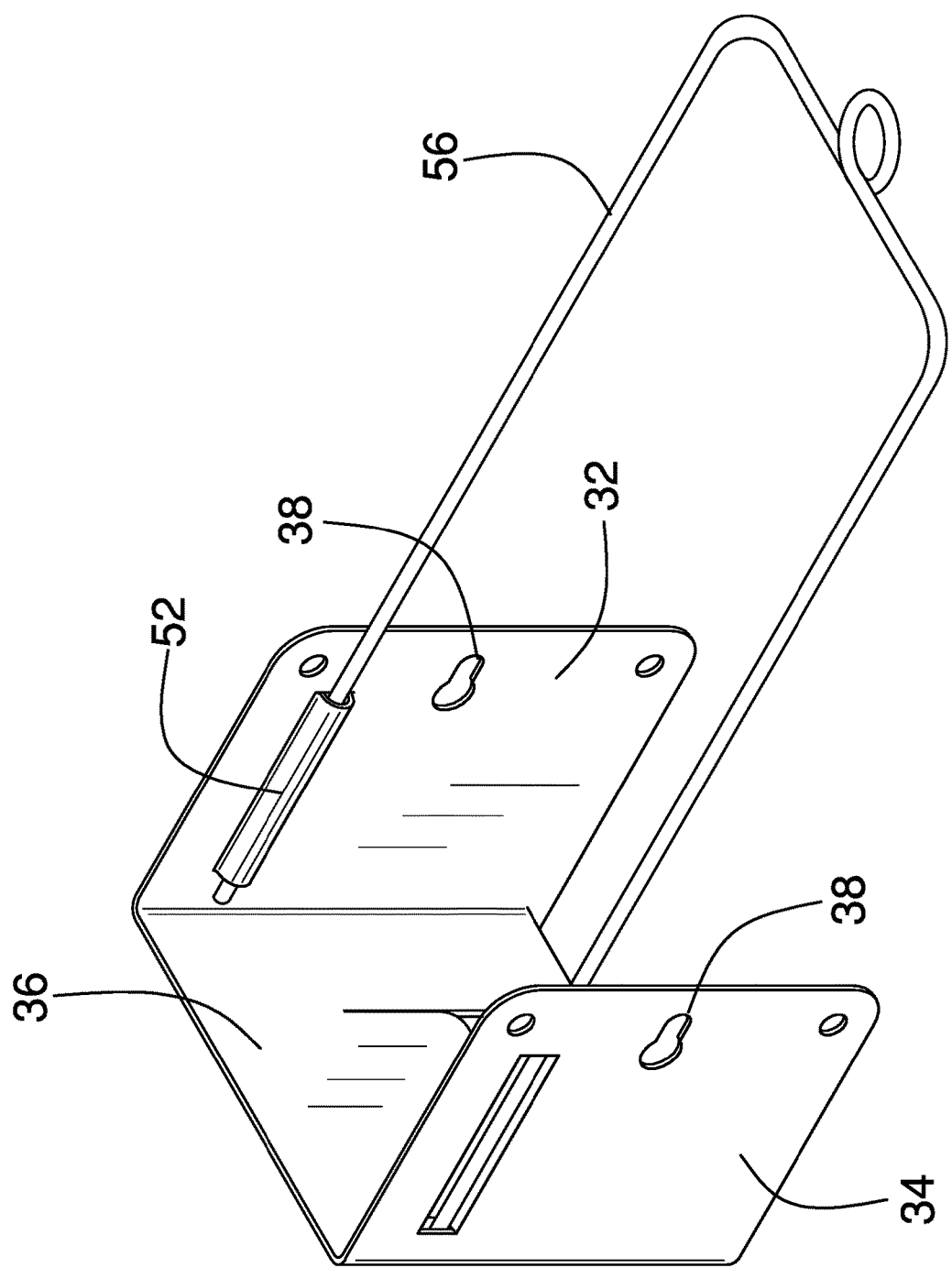
FIG. 7 is a top isometric, in-use view of an embodiment of the disclosure.

The plate 12 has a pair of slots 38 therein. The slots 38 are equally spaced from the third 22 and fourth 24 edges. One of the slots 38 is positioned adjacent to the first edge 18 and one of the slots 38 is positioned adjacent to the second edge 20. The slots 38 are each elongated along a line extending through the first 18 and second 20 edges. The slots 38 each have a narrow portion 40 and a wide portion 42. The wide portions 42 are configured to receive the head of a fastener, such as a nail head, where after the shaft of the fastener can then be slid into an associated narrow portion 40. As shown in FIG. 7, when the plate 12 is folded along the fold lines 30, the slots 38 are generally aligned with each other and can be used to mount the plate 12 on a fixed object having a fastener therein such as a post or a tree.

The plate 12 has an opening 44 extending therethrough. The opening 44 is equally spaced from the first 18 and second 20 edges. The opening 44 is positioned nearer to the fourth edge 24 than the third edge 22. The opening 44 has a distal edge 46 with respect to the fourth edge 24. A pair of slits 48 extends through the distal edge 46. The slits 48 are spaced from each other such that a flange 50 is defined between the slits 48. The flange 50 is configured to be bendable around a loop 78 of a torsion spring 76.

A pair of sleeves 52 is formed in the plate 12. The sleeves 52 are each elongated and orientated parallel to the third edge 22. One of the sleeves 52 is positioned adjacent to the first edge 18 and one of the sleeves 52 is positioned adjacent to the second edge 20. The sleeves 52 each have a pair of open ends 54 and are configured to receive a bracket 56 attachable to a post 58 or rod comprised of wood, plastic or metal which is driven into the ground.

A tab 60 is attached to and extends away from the fourth edge 24. The tab 60 is positioned between a middle portion of the panel 12 and the first edge 18. The tab 60 has a break 62 therein aligned with the fourth edge 24 and extending toward the first edge 18 to define a free section 64 of the tab 60 extending along the fourth edge 24. The free section 64 is configured to be bendable around an arm 77 of the torsion spring 76 to inhibit movement of the torsion spring 76 relative to the plate 12. The tab 60 and the flange 50 form couplers for coupling the plate 12 to a body trap 66. The body trap 66 includes a pair of jaws 68 and the arms 77 of the torsion spring 76 engage the jaws 68. A trigger 70 on the body trap 66 is used release the dog 72 holding the jaws 68 in place when the body trap 66 is set.

Figure 4:
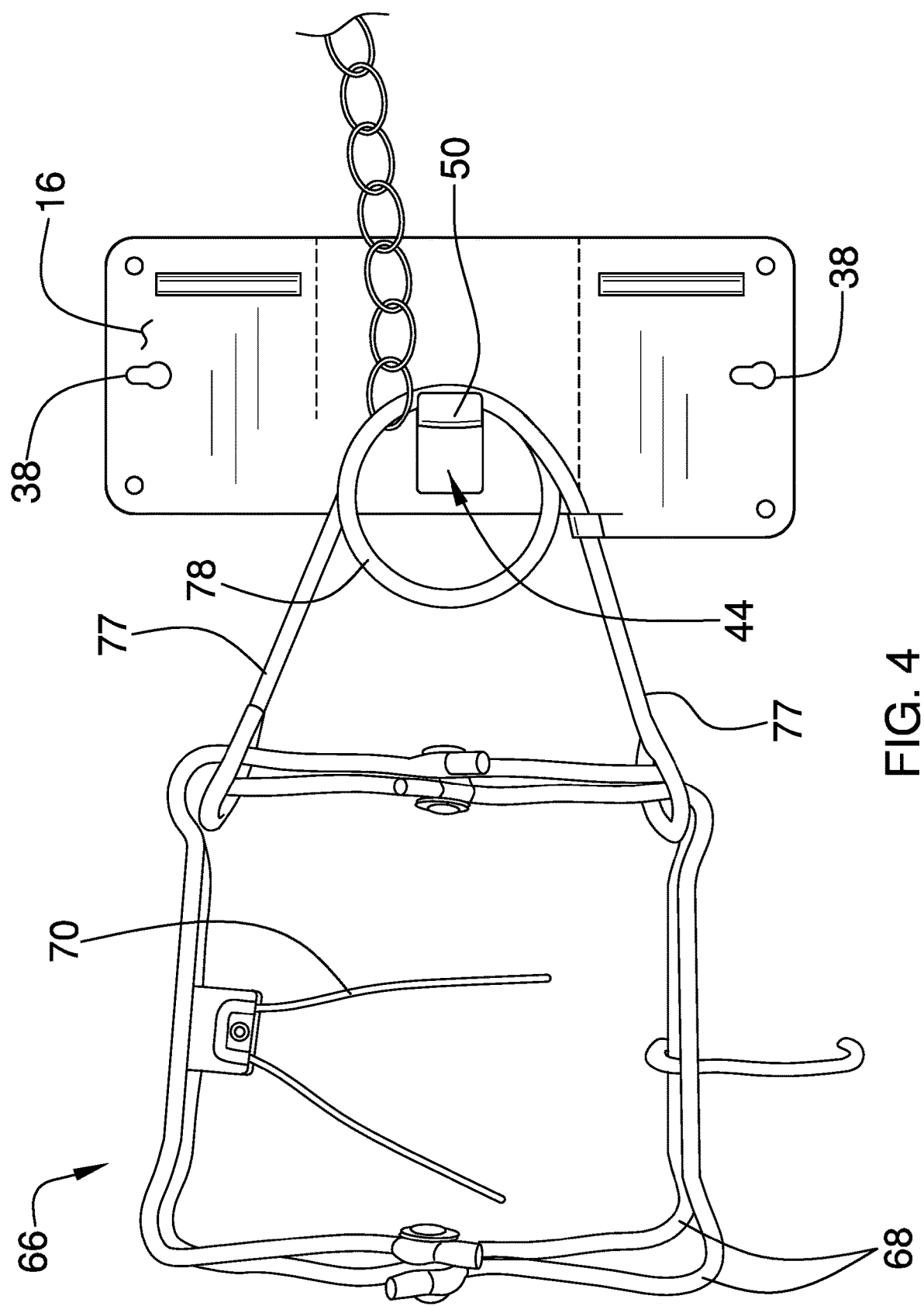
FIG. 4 is a bottom in-use view of an embodiment of the disclosure.
Figure 5:
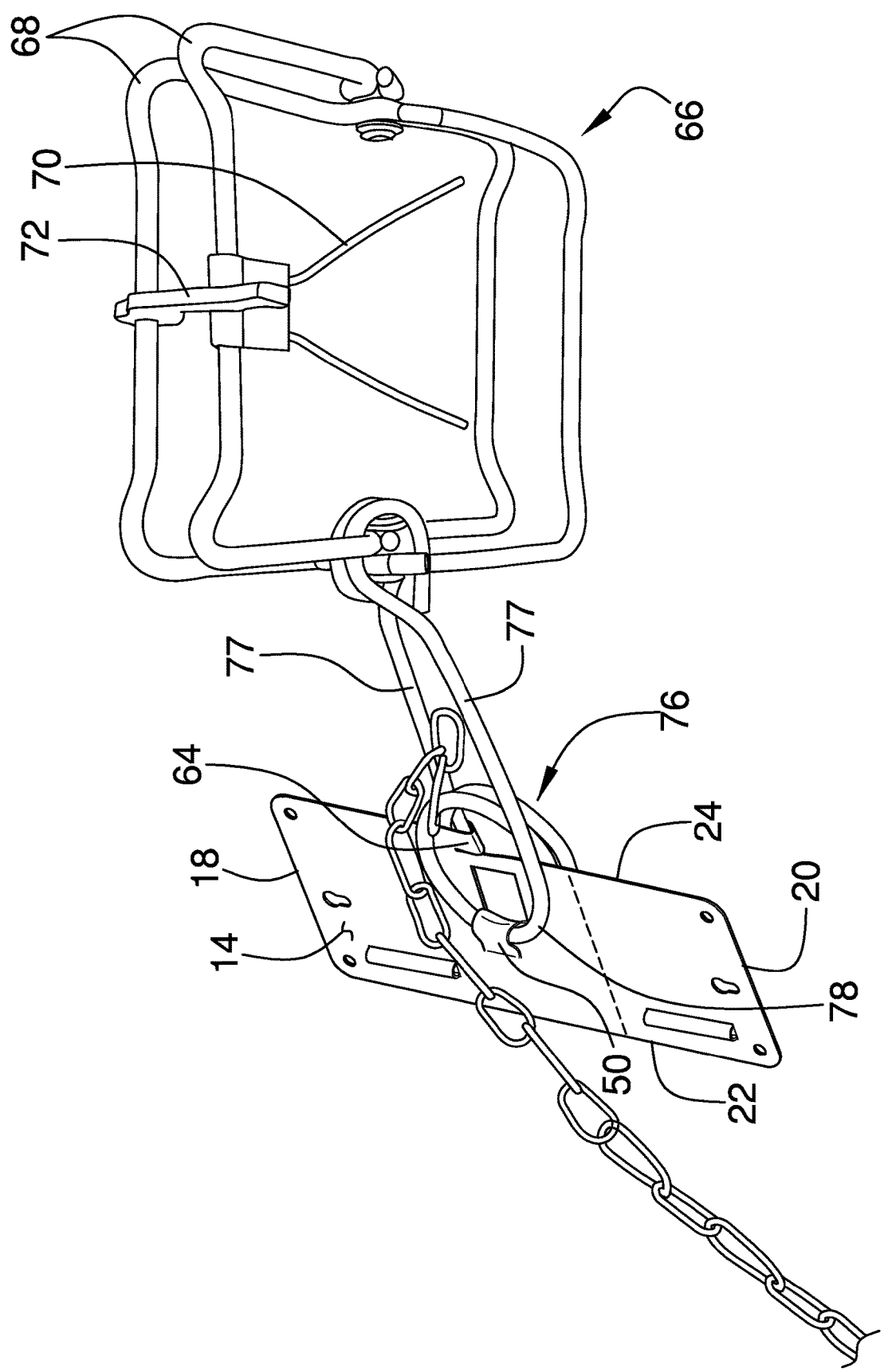
FIG. 5 is a top isometric in-use view of an embodiment of the disclosure.
Figure 6:
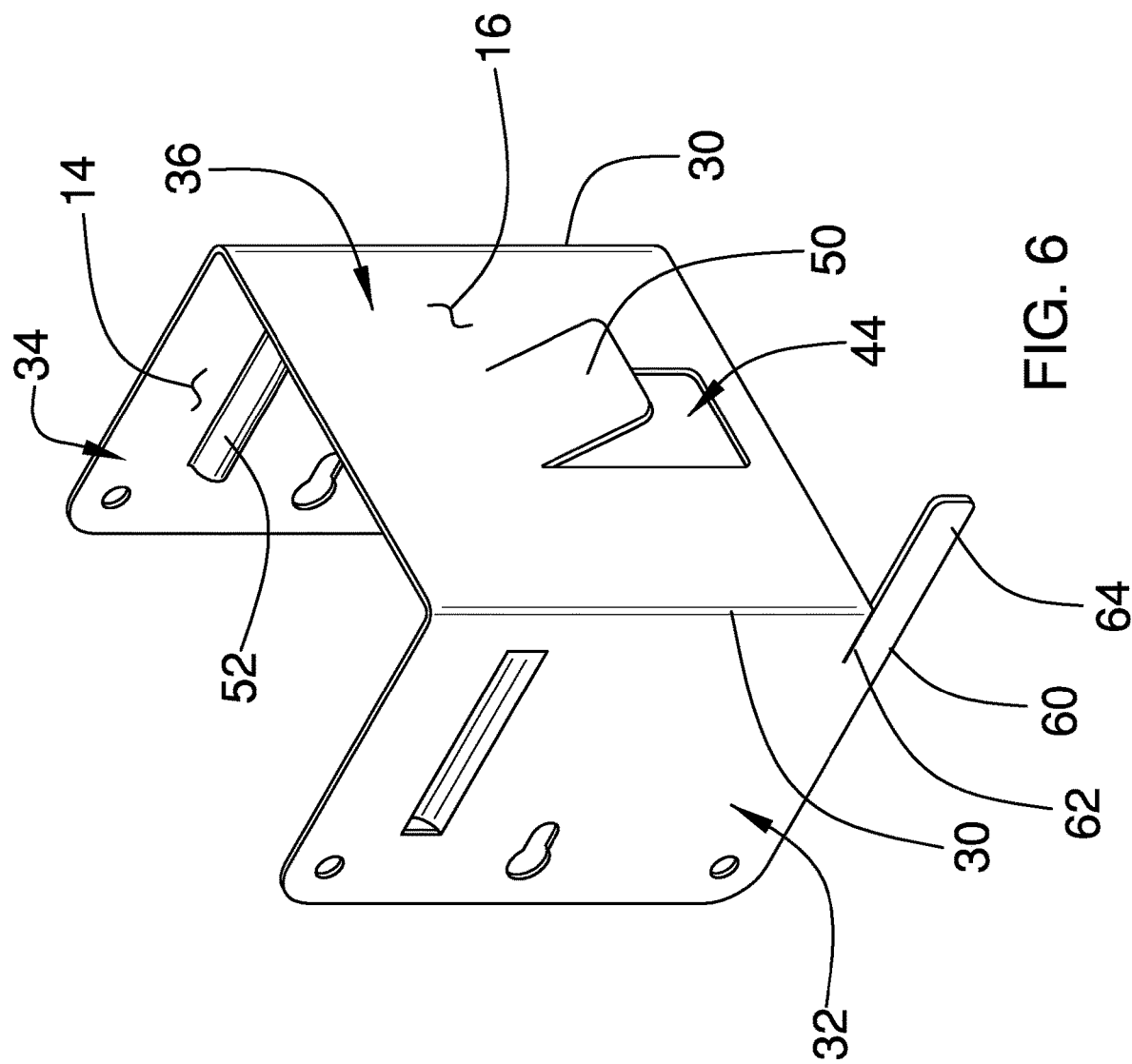
FIG. 6 is a bottom isometric, in-use view of an embodiment of the disclosure.

In use, the plate 12 is extended between the loops 78 of the torsion spring 76 and frictionally held in place. The flange 50 is then extended around one of the loops 78 to hold the loops 78 in place on the plate 12. The arms 77 of the torsion spring 76 extend away from the fourth edge 24 and the free section 64 of the tab 60 is extended around one of the arms 77 to further stabilize the body trap 66 relative to the plate 12. As can be seen in FIG. 5, the third edge 22 is then abutted on a ground surface to retain the body trap 66 in an upright position in its armed condition such that an animal receiving orifice of the body trap 66 is vertically orientated. FIG. 4 depicts the body trap 66 in the disarmed condition.

Figure 8:
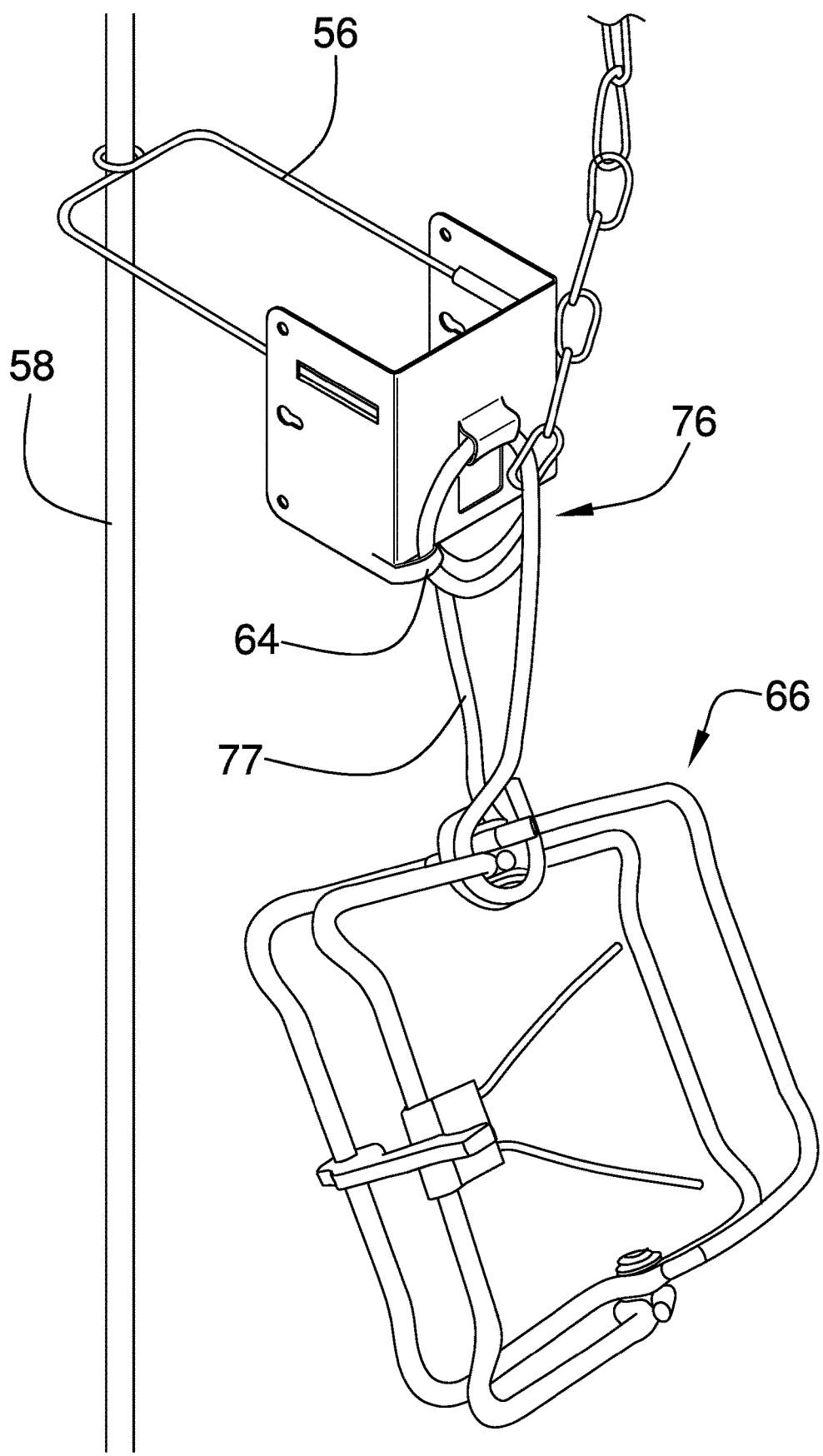
FIG. 8 is a bottom isometric, in-use view of an embodiment of the disclosure.

Alternatively, as shown in FIGS. 7 and 8, the plate 12 may be folded along its fold lines 30 such that the first 32 and second 34 sections extend in the same direction with respect to each other. A bracket 56 with a pair of legs is extended through the sleeves 52 and the bracket positioned on a post 58 that is extended into the ground. The body trap 66 is attached to the plate 12 as described above. The body trap 66 may then be suspended over an animal burrow entrance, for example, in a selected orientation to enhance the effectiveness of the body trap 66.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A trap stabilizing assembly comprising:
   a plate having a top side, a bottom side, a first edge, a second edge, a third edge and a fourth edge, the first and second edges being positioned opposite of each other, the plate being comprised of a rigid material;
   the plate having an opening extending therethrough, the opening being equally spaced from the first and second edges, the opening being positioned nearer to the fourth edge than the third edge, the opening having a distal edge with respect to the fourth edge, a pair of slits extending through the distal edge, the slits being spaced from each other such that a flange is defined between the slits, the flange being configured to be bendable around a loop of a torsion spring; and
   a tab being attached to and extending away from the fourth edge, the tab being positioned between a middle portion of the panel and the first edge, the tab having a break extending partially along and between the tab and the fourth edge of the plate wherein the tab includes an integrally coupled portion and a free section aligned with and extending along the fourth edge, the free section being configured to being bendable around an arm of the torsion spring to inhibit movement of the torsion spring relative to the plate.

2. The trap stabilizing assembly according to claim 1, wherein the plate has a width from the first edge to the second edge between 7.0 inches and 9.0 inches and a length from the third edge to the fourth edge between 3.0 inches and 5.0 inches.

3. The trap stabilizing assembly according to claim 1, wherein the plate has four corners, each of the corners being rounded.

4. The trap stabilizing assembly according to claim 1, wherein the plate has a plurality of corner apertures therein extending through the top and bottom sides, the plate having four corners, each of the four corners having one of the corner apertures positioned adjacent thereto, each of the corner apertures having a diameter between 0.20 inches and 0.30 inches.

5. The trap stabilizing assembly according to claim 1, further including a pair of fold lines being positioned in the plate and extending from the third edge to the fourth edge, the fold lines facilitating the bending of the plate along the fold lines, the fold lines being spaced from each other and dividing the panel into a first section including the first edge, a second section including the second edge and a third section positioned between the first and second sections.

6. The trap stabilizing assembly according to claim 4, wherein each of the first and second sections has a same width as each other, the third section having a width between 2.0 inches and 4.0 inches.

7. The trap stabilizing assembly according to claim 1, wherein the plate has a pair of slots therein, each of the slots being equally spaced from the third and fourth edges, one of the slots being positioned adjacent to the first edge and one of the slots being positioned adjacent to the second edge.

8. The trap stabilizing assembly according to claim 2, wherein each of the slots is elongated along a line extending through the first and second edges, each of the slots having a narrow portion and a wide portion, wherein the wide portions are configured to receive the head of a fastener such that the fastener can be slid into an associated narrow portion.

9. The trap stabilizing assembly according to claim 1, further including a pair of sleeves being formed in the plate such that each sleeve extends from the top side defining a respective conduit adjacent to the top side, the sleeves each being elongated and being orientated parallel to the third edge, one of the sleeves being positioned adjacent to the first edge and one of the sleeves being positioned adjacent to the second edge, each of the sleeves having a pair of open ends and being configured to receive a bracket attachable to a post.

10. A trap stabilizing assembly comprising:
a plate having a top side, a bottom side, a first edge, a second edge, a third edge and a fourth edge, the first and second edges being positioned opposite of each other, the plate being comprised of a rigid material, the plate having a width from the first edge to the second edge between 7.0 inches and 9.0 inches and a length from the third edge to the fourth edge between 3.0 inches and 5.0 inches, the plate having four corners, each of the corners being rounded;
the plate having a plurality of corner apertures therein extending through the top and bottom sides, each of the four corners having one of the corner apertures positioned adjacent thereto, each of the corner apertures having a diameter between 0.20 inches and 0.30 inches;
a pair of fold lines being positioned in the plate and extending from the third edge to the fourth edge, the fold lines facilitating the bending of the plate along the fold lines, the fold lines being spaced from each other and dividing the panel into a first section including the first edge, a second section including the second edge and a third section positioned between the first and second sections, each of the first and second sections having a same width as each other, the third section having a width between 2.0 inches and 4.0 inches;
the plate having a pair of slots therein, each of the slots being equally spaced from the third and fourth edges, one of the slots being positioned adjacent to the first edge and one of the slots being positioned adjacent to the second edge, each of the slots being elongated along a line extending through the first and second edges, each of the slots having a narrow portion and a wide portion, wherein the wide portions are configured to receive the head of a fastener such that the fastener can be slid into an associated narrow portion;
the plate having an opening extending therethrough, the opening being equally spaced from the first and second edges, the opening being positioned nearer to the fourth edge than the third edge, the opening having a distal edge with respect to the fourth edge, a pair of slits extending through the distal edge, the slits being spaced from each other such that a flange is defined between the slits, the flange being configured to be bendable around a loop of a torsion spring;
a pair of sleeves being formed in the plate such that each sleeve extends from the top side defining a respective conduit adjacent to the top side, the sleeves each being elongated and being orientated parallel to the third edge, one of the sleeves being positioned adjacent to the first edge and one of the sleeves being positioned adjacent to the second edge, each of the sleeves having a pair of open ends and being configured to receive a bracket attachable to a post; and
a tab being attached to and extending away from the fourth edge, the tab being positioned between a middle portion of the panel and the first edge, the tab having a break extending partially along and between the tab and the fourth edge of the plate wherein the tab includes an integrally coupled portion and a free section aligned with and extending along the fourth edge, the free section being configured to being bendable around an arm of the torsion spring to inhibit movement of the torsion spring relative to the plate.

11. A method stabilizing a trap including the steps of:
providing a body trap including a pair of jaws, a trigger engaging the jaws, and a torsion spring being attached to the jaws;
engaging the torsion spring with a plate, the plate has a top side, a bottom side, a first edge, a second edge, a third edge, and a fourth edge, the torsion spring including a plurality of loops, the loops being attached to the plate such that arms of the torsion spring extends away from the fourth edge; and
positioning the third edge on a ground surface such that an animal receiving orifice of the body trap is vertically orientated.

12. The method stabilizing a trap according to claim 11, wherein the step of engaging the torsion spring with the plate further includes the plate having an opening extending therethrough, the opening being equally spaced from the first and second edges, the opening being positioned nearer to the fourth edge than the third edge, the opening having a distal edge with respect to the fourth edge, a pair of slits extending through the distal edge, the slits being spaced from each other such that a flange is defined between the slits, the flange extending around the loop of the torsion spring.

13. The method stabilizing a trap according to claim 12, wherein the step of engaging the torsion spring with the plate further includes a tab being attached to and extending away from the fourth edge, the tab being positioned between a middle portion of the panel and the first edge, the tab having a break therein aligned with the fourth edge and extending toward the first edge to define a free section of the tab extending along the fourth edge, the free section being bendable around the arm of the torsion spring to inhibit movement of the torsion spring relative to the plate.

\* \* \* \* \*